Figure 1:
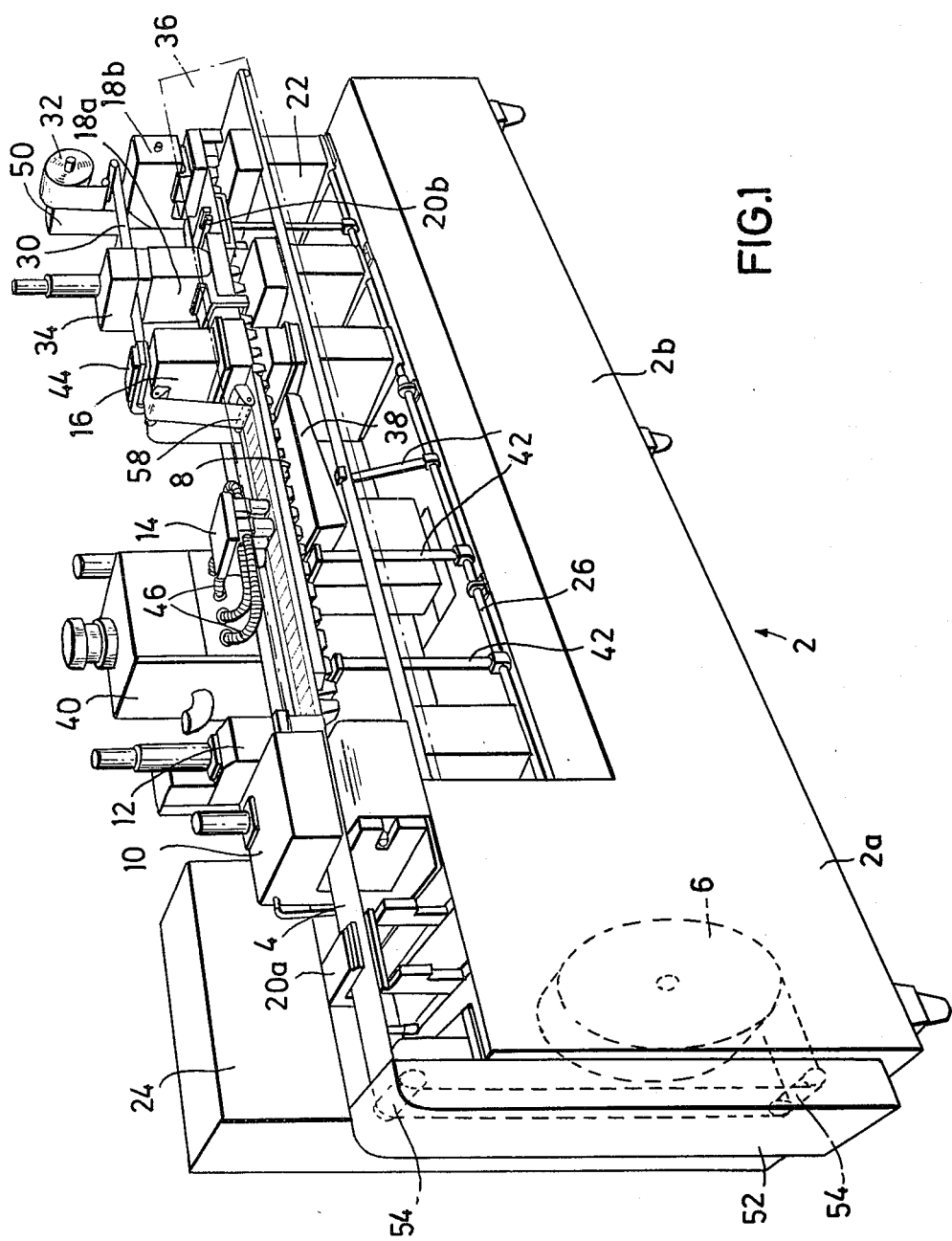

United States Patent [19]
Donnet

[11] 3,938,302
[45] Feb. 17, 1976

[54] MACHINE FOR AUTOMATICALLY PRODUCING OPTIONALLY EMPTY OR FILLED PACKAGING CONTAINERS MADE OF THERMOPLASTIC FILM MATERIAL

[75] Inventor: Henry Donnet, Falaise, France

[73] Assignee: Ste. d'Application Plastique Mecanique et Electronique Plastimecanique, Courbevoie, France

[22] Filed: Nov. 6, 1973

[21] Appl. No.: 413,193

[30] Foreign Application Priority Data
Nov. 9, 1972 Germany............................ 2254738

[52] U.S. Cl.................... 53/167; 53/184 R; 425/383
[51] Int. Cl.². B65B 3/02; B65B 43/08; B65B 59/04
[58] Field of Search ......... 53/112 A, 167, 184, 201, 53/281, 282; 425/383

[56] References Cited
UNITED STATES PATENTS
3,000,157  9/1961  Ollier et al............................ 53/184
3,221,472  12/1965  Groth et al. .......................... 53/184
3,465,494  9/1969  Garrett et al. ..................... 53/281 X
3,524,298  8/1970  Hamilton .......................... 53/184 X
3,564,812  2/1971  Mueller et al. ................... 53/282 X FOREIGN PATENTS OR APPLICATIONS
1,212,838  11/1970  United Kingdom................... 53/184
1,274,952  8/1968  Germany.............................. 53/184

Primary Examiner—Robert L. Spruill
Attorney, Agent, or Firm—Parmelee, Miller, Welsh & Kratz

[57] ABSTRACT

An improved apparatus for producing optionally empty or filled containers wherein the support structure comprises a closed housing having a cubic end section and an elongated L-shaped section in flush relationship therewith. Various elements for producing the containers are disposed in C-shaped housings mounted for displacement along rails on the L-shaped section.

8 Claims, 2 Drawing Figures

MACHINE FOR AUTOMATICALLY PRODUCING OPTIONALLY EMPTY OR FILLED PACKAGING CONTAINERS MADE OF THERMOPLASTIC FILM MATERIAL

The present invention concerns a machine for automatically producing optionally empty or filled packaging containers made of thermoplastic film material which is passed from one or more supply rollers first through a heating device, then a shaping apparatus, optionally a filling apparatus, next a sealing apparatus and finally a stamping machine.

This kind of machine is preferred in particular for the packaging of dairy products and similar liquid or pasty foods. In packaging foods however particularly stringent requirements are imposed as regards the cleanliness of the machines and hygienic filling of the containers. It is also required that all those parts of the machine located near the food product to be decanted or near the packaged material should be readily accessible for the purpose of cleaning.

In the known machines these requirements are either not met or are fulfilled only partially, since in these machines the machine beds are fully open in some zones, and the drives for the various devices and tools are more or less uncovered because in none of these known machines are the machine bed and the machine equipment designed to provide them with sufficiently smooth surfaces to enable cleaning to be readily carried out, and because these known machines are not put together in such a way that all those units of the equipment that need not or should not come into contact with the goods, either before or after they have been packaged, are disposed outside the zone where these goods pass through the equipment.

The object of the present invention is to provide a machine for automatically producing optionally empty or filled packaging containers made of thermoplastic film material which passes from one or more supply rolls first through a heating device, then a shaping apparatus, optionally a filling apparatus, next a sealing apparatus and finally a stamping machine, which machine avoids the aforementioned disadvantages, and all the parts of which, but particularly those parts that come into contact with the goods to be decanted and packaged, are readily accessible and easy to clean, the drives for the various devices and tools being completely protected and not coming into contact either with the goods before and after packaging, or with the cleaning agent, and in which those parts of the machine that have to be frequently and thoroughly cleaned are separated spatially from those not requiring to be cleaned so frequently.

According to the invention this object is achieved by the provision of a machine stand which consists of a sheet-metal structure closed on all sides and which has a substantially cubical end part, in which the roll of film material and apparatus for feeding the film material are arranged, and a supporting part of substantially L-shaped cross section which is connected flush with the end part, and in a frontward-facing opening in which the devices are disposed for displacement and immobilization, at least some of these devices having a C-shaped housing the opening in which faces forwards and in the limbs of which the drive for the tools is fully encased in such manner that, apart from the control lines connected to the machine control system arranged on the cubical end part of the machine stand, no operative connection exists between the machine stand and the devices.

The proposal of the invention to form the machine stand as a sheet-metal structure which is closed on all sides and has a cubical end part accommodating the roll of film material, the apparatus for feeding this material, and the machine control system, and which has a substantially L-shaped supporting part for the devices that is connected to the end part results in spatial separation of those parts of the machine, that do not come into contact with the products to be decanted or the packaged products, from those parts that are constantly in contact with these products and therefore have to be frequently and thoroughly cleaned. At the same time cleaning of the smooth-surfaced machine parts is rendered very easy by spraying with hot water and a cleaning agent. Since the drives for the tools are fully enclosed in the casing of the apparatus, no special attention at all has to be paid to these items of equipment during cleaning. Furthermore, due to the devices being open at one side, the tools themselves are readily accessible, and cleaning can be easily carried out at these points too.

In accordance with an advantageous further feature of the invention, a rail or bar, which acts as a lower support for the devices, is provided on the upper face of the forwardly extending lower limb of the L-shaped carrier part, while a rail or bar, acting as a second support for the devices, is provided on the upwardly directed rear limb of the L-shaped supporting part.

This form of the holders for the devices on the one hand ensures that the devices can be readily displaced and immobilized on the machine stand, so that the machine can be readily reset to deal with different sizes of container, while on the other hand the very fact that the devices can be displaced further facilitates cleaning of the machine and its units on all sides.

In accordance with a further feature of the invention, there is provided at the front end of the forwardly directed lower limb of the L-shaped supporting part, an upwardly extending rib which in conjunction with the forwardly and downwardly sloping surface of the lower limb forms a drainage channel.

This measure also contributes towards keeping the machine clean since any material intended to be filled into the containers that overflows or splashes over can thus be trapped and guided to a point where it can be collected.

Figure 2:
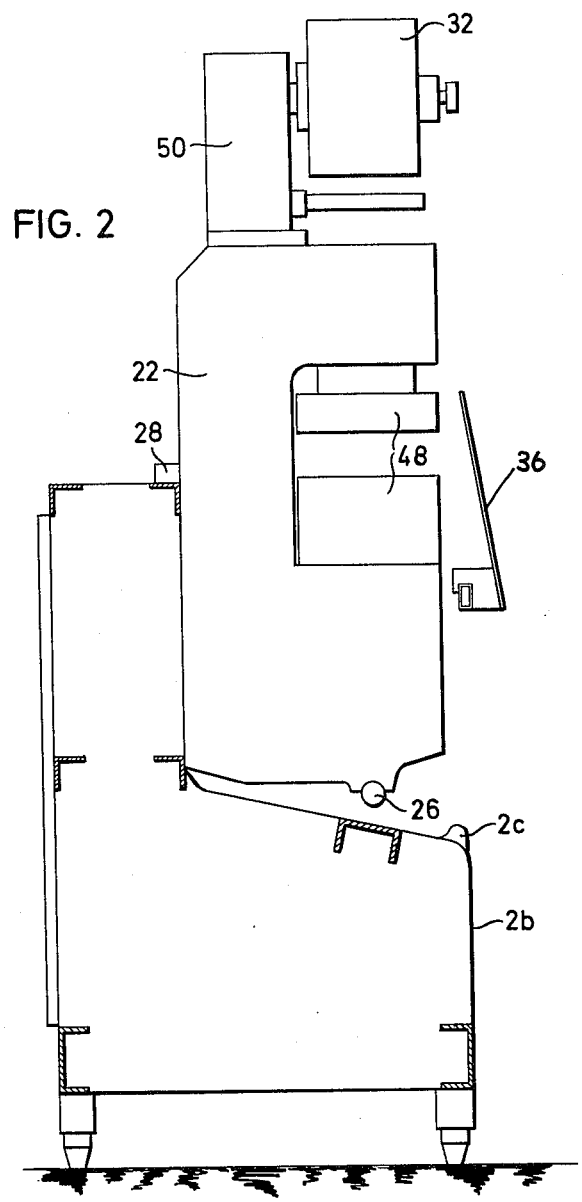

An embodiment of the invention will now be described by reference to the annexed drawing in which:

FIG. 1 is a diagrammatic perspective illustration of the machine of the invention, and FIG. 2 is a section through the machine of the invention at a point just in front of the stamping tool.

As will be seen from FIG. 1, the machine stand 2, which accommodates or supports all the devices and units required for operating the machine, consists of a cubical end part 2a and a carrier part 2b of substantially L-shaped cross-section which is connected flush with said end part. The machine stand is composed of U-girders and L-girders which form a frame over which is fitted a sheet-metal jacket which is closed on all sides. To render the interior of the machine stand 2 accessible, the jacket has openings which can be closed in a water-tight manner. Mounted in the cubical end part 2a of the machine stand is the supply roll 6 of thermoplastic film material 4, this roll being introduced through an opening closed by a hood 52. This hood 52 accommodates guide rollers 54 for directing the film material from the supply roll 6 into the plane in which it is to travel through the machine. In an upstanding structure 24 on the cubical end part 2a of the machine stand there are arranged the machine-control system and the drive for the means for feeding the film material, which feed means passes the film material through the machine in synchronism with the stroke of the machine. The feed means consists of a first gripping device 20a, which is fitted in front of the holding device 10, and of a second gripping device 20b, disposed in front of the last stamping tool 18b. The two gripping devices draw the film material 4 through the machine in synchronism with the stroke of the machine-control system, and in the present machine these gripping devices 20a and 20b are interconnected by means of a displaceable rod (not illustrated) extending the length of the machine, and by a common feed mechanism contained in the end part 2a beneath the structure 24 in which the machine-control means is accommodated.

The L-shaped carrier part 2b accommodates the various devices which are used in the machine of the invention and which are disposed in the forwardly facing opening in the carrier part 2b. A rail or bar 26, arranged on the upper face of the forwardly directed lower limb of the L-shaped supporting part 2b acts as a support for the devices, whereas a second support for the devices is constituted by a rail or bar 28 on the upwardly directed rear limb of the L-shaped supporting part 2b. A rib 2c at the forward edge of the forwardly extending lower limb of the L-shaped supporting part 2b forms, in conjunction with the forwardly and downwardly sloping surface of the lower limb, a drainage channel for fluids which drip from the devices, and these fluids can be trapped at the end of the machine. These dripping fluids may be either sloppings of the product being filled into the containers, or cleaning liquid for example.

A heating device 10, a shaping station 12, a filling device 14, a sealing device 16 and two stamping tools 18a and 18b are provided for shaping, filling, sealing and stamping out the containers. The shaping apparatus 12, the sealing apparatus 16 and the stamping tools 18a and 18b are mounted in substantially similar manner, each in a fully enclosed C-shaped housing 22, the opening in which faces forwardly and in the limbs of which are accommodated the drive for the tools 48. As previously mentioned the rail or bar 26 acts as a supporting element for these devices, whereas the rail or bar 28 constitutes the rear support for the C-shaped housing 22 of each of the devices. It is thus possible to arrange the devices to be displaceable along and immobilized on the L-shaped supporting part 2b, so that they can be adjusted or changed to deal with different forms and sizes of container or other packaging means 8. The heating device 10 which is designed as a contact-heating means is firmly screwed on to the cubical end part 2a.

The filling device 14 is connected through a hose 46 to the dispensing means 40 which is fitted behind the rear wall of the machine and is supplied with the product from a tank, not illustrated. Below the filling device 14 there is arranged a flat dish 38 which acts as a receiving vessel for any of the product that trickles down when for example the containers are unsound. The uprights 42 are for supporting the shaped containers 8, the dish 38 and the transparent front covering 36.

The supply roll 32 from which is drawn the covering film or foil 30, which may be made of plastics material or aluminium, is carried on a stand 50 which is secured to the stamping device 18b, or to be more precise, to the C-shaped casing 22 of this stamping device. The printed covering film or foil 30 then passes through a means 34 for checking that the printed matter on the covering film or foil is correctly located in relation to the position of the containers 8, and then to a marking stamp device 44 which stamps the covering film or foil with the date when the product was decanted and packaged. Finally the covering film or foil 30 passes over guide rollers 58 to a point above the filled containers 8 and is sealed on to them in the sealing device 16.

The mode of operation of a machine of this kind for automatically producing optionally empty or filled packaging containers made of thermoplastic film material is well known, so that there is no need to describe it in detail here. It might simply be mentioned that the stamping out of the filled and closed containers is carried out in two stages: preliminary stamping takes place in the stamping device where the film is cut in the longitudinal direction and at the same time the gussets between pairs of adjacent containers is cut away, whereas final singling of the containers is carried out in the stamping device 18b.

As will have been appreciated, the machine stand is divided into two main zones including one which does not come into contact with the product to be decanted or with the filled containers. This zone does not need to be as thoroughly cleaned as the second zone which corresponds to the L-shaped supporting part 2b on which the various devices that come into contact with the product are positioned. For this reason the machine control system is arranged on the end part 2a, since this is the most difficult to protect against splashing by the product being filled into the containers and against the effects of the necessary intensive cleaning operations. As previously mentioned, the shaping, filling, sealing and stamping devices are all fully encased and are carried by the completely fluid-tight L-shaped supporting part 2b, so that this part of the machine can be cleaned by means of a jet of water without the need for taking special precautions.

Since the drive for the tools 48 is positioned within the C-shaped housing 22 for the devices of the machine, there is no operative connection whatsoever between the machine stand and these devices; instead, only the control lines, which are connected to the structure 24 for the machine-control system, run from the housing 22.

Because of its simple construction and its smooth-surfaced exterior, the machine of the invention can be used in the food industry with particularly good results, but is not limited to this field of application.

All the details and features disclosed herein, especially the spatial arrangement and construction of the apparatus, are claimed as being important to the invention as far as, singly or in combination, they do not form part of the prior art.

What is claimed is:

1. For use with an apparatus for producing containers from a web of thermoplastic film said apparatus comprising means for feeding said film from a supply roll and passing said film successively through processing devices, including heating, shaping, sealing and stamping units, the hereinafter defined invention comprising an improved, combined supporting structure and housing for said apparatus formed of structural metal sections and a sheet metal covering wherein there is provided:

1. an initial compartment having a generally cubic configuration adapted to support and enclose therein at one side thereof the said supply roll and associated feed means, said compartment having a removable cover to afford access to the supply roll and feed means; the other side of said compartment serving as an enclosure for the control mechanisms of the various process devices;
2. an elongated compartment which is L-shaped in transverse section and which is generally coextensive with the length of the remainder of the apparatus and which forms a continuation of the cubical compartment, the horizontal leg of the L-shape being in longitudinal alignment with the said one side of the cubical compartment and the vertical leg of the L-shape being in line with the said other side of the cubical compartment; the horizontal leg of the L-shaped compartment having a transversely inclined sheet metal covering which slopes downwardly and outwardly from the vertical leg toward the forward terminal end of the horizontal leg; and
3. a plurality of spaced apart, forwardly and outwardly facing generally C-shaped housings supported in the angle of the elongated L-shaped compartment, the lower limb of each of said C-shaped housings overhang, in spaced relation thereto, the sloping top of the horizontal leg of the L-shaped compartment, each of said C-shaped housings adapted to enclose and protect in its upper and lower limbs the operating mechanism of a respective processing device.

2. The improvement of claim 1 further including a rigid horizontal rail member extending lengthwise above the sloping cover of the horizontal leg of the L-shaped compartment and a rigid horizontal rail member extending lengthwise along the top of the vertical leg of the L-shaped compartment, said C-shaped housings engaging said rail members and being supported thereby.

3. The improvement of claim 2 wherein said C-shaped housings are adapted so as to be longitudinally displaceable along said rail members.

4. The improvement of claim 1 wherein the forward terminal end of the horizontal leg of the L-shaped compartment is provided with a longitudinally extending, upwardly directed lip, the sloping top surface of the horizontal leg and said lip cooperating to form a drainage channel.

5. For use with an apparatus for forming containers from a web of thermoplastic film and filling the containers with product said apparatus comprising means for feeding said film from a supply roll and passing said film successively through a heating unit, a shaping unit, a product filling unit, a sealing unit and a stamping unit, the hereinafter defined invention comprising an improved, combined supporting structure and housing for said apparatus formed of structural metal sections and a sheet metal covering wherein there is provided:

1. an initial compartment having a generally cubic configuration adapted to support and enclose therein at one side thereof the said supply roll and associated feed means, said compartment having a removable cover to afford access to the supply roll and feed means; the other side of said compartment serving as an enclosure for the control mechanisms of the various process units;
2. an elongated compartment which is L-shaped in transverse section and which is generally coextensive with the length of the remainder of the apparatus and which forms a continuation of the cubical compartment, the horizontal leg of the L-shape being in longitudinal alignment with the said one side of the cubical compartment and the vertical leg of the L-shape being in line with the said other side of the cubical compartment; the horizontal leg of the L-shaped compartment having a transversely inclined sheet metal covering which slopes downwardly and outwardly from the vertical leg toward the forward terminal end of the horizontal leg; and
3. a plurality of spaced apart, forwardly and outwardly facing generally C-shaped housings supported in the angle of the elongated L-shaped compartment, the lower limb of each of said C-shaped housings overhang, in spaced relation thereto, the sloping top of the horizontal leg of the L-shaped compartment, one each of said C-shaped housings being provided for each of said heating, shaping, sealing and stamping units and adapted to enclose and protect in its upper and lower limbs the operating mechanism of a respective unit.

6. The improvement of claim 5 further including a rigid horizontal rail member extending lengthwise above the sloping cover of the horizontal leg of the L-shaped compartment and a rigid horizontal rail member extending lengthwise along the top of the vertical leg of the L-shaped compartment, said C-shaped housings and said filling unit engaging said rail members and being supported thereby.

7. The improvement of claim 6 wherein said C-shaped housings and said filling unit are adapted so as to be longitudinally displaceable along said rail members.

8. The improvement of claim 5 wherein the forward terminal end of the horizontal leg of the L-shaped compartment is provided with a longitudinally extending, upwardly directed lip, the sloping top surface of the horizontal leg and said lip cooperating to form a drainage channel.

* * * * *